United States Patent
Zhang et al.

(10) Patent No.: US 9,137,731 B2
(45) Date of Patent: Sep. 15, 2015

(54) METHOD, DEVICE AND SYSTEM FOR UNIFORM NUMBER COMMUNICATION ON A HOME GATEWAY

(71) Applicant: HUAWEI DEVICE CO., LTD., Shenzhen (CN)

(72) Inventors: Ke Zhang, Shenzhen (CN); Jin Hua, Shenzhen (CN)

(73) Assignee: HUAWEI DEVICE CO., LTD., Shenzhen (CN)

( * ) Notice: Subject to any disclaimer, the term of this patent is extended or adjusted under 35 U.S.C. 154(b) by 4 days.

(21) Appl. No.: 13/684,909

(22) Filed: Nov. 26, 2012

(65) Prior Publication Data
US 2013/0079023 A1    Mar. 28, 2013

Related U.S. Application Data (63) Continuation of application No. PCT/CN2011/074705, filed on May 26, 2011.

(30) Foreign Application Priority Data
May 26, 2010    (CN) .......................... 2010 1 0183342

(51) Int. Cl.
*H04W 40/00*    (2009.01)
*H04L 12/66*    (2006.01)
(Continued)

(52) U.S. Cl.
CPC ............... *H04W 40/00* (2013.01); *H04L 12/66* (2013.01); *H04L 65/1026* (2013.01);
(Continued)

(58) Field of Classification Search
CPC ..... H04W 64/00; H04W 40/00; H04W 76/02; H04L 12/66; H04L 65/1026; H04L 65/1036; H04L 65/1073; H04L 65/1076; H04M 3/42102; H04M 3/46; H04M 7/125
USPC ............... 455/445, 414.1–414.4; 379/201.02, 379/211.01, 211.02
See application file for complete search history.

(56) References Cited

U.S. PATENT DOCUMENTS 7,590,103 B2 *    9/2009  Fujiwara et al. ............... 370/352
8,144,856 B2 *    3/2012  Forte ........................ 379/211.01
(Continued)

FOREIGN PATENT DOCUMENTS

CN    1692612    11/2005
CN    101442738    5/2009
(Continued)

OTHER PUBLICATIONS

International Search Report, dated Sep. 8, 2011, in corresponding International Application No. PCT/CN2011/074705 (4 pp.).
(Continued)

Primary Examiner — Khawar Iqbal
(74) Attorney, Agent, or Firm — Staas & Halsey LLP (57) ABSTRACT

The embodiments of the invention disclose a method, a device and a system for uniform number communication and relate to the technology field of mobile communication. The application of the uniform number service on a home gateway can be optimized by automatically configuring a uniform number and the incoming call priority of the bound numbers on the home gateway, and thus the user experience is improved and simultaneously the maintenance workload is reduced. The method for the uniform number communication includes the following steps: binding the terminal numbers of the terminals which are connected to an interface of the home gateway to a uniform number; configuring binding relation for the bound terminal numbers, wherein the binding relation includes the bound terminal numbers and the incoming call priority of the bound terminal numbers; and sending a uniform number binding message that carries the uniform number and the binding relation.

7 Claims, 4 Drawing Sheets

(51) Int. Cl.
  *H04M 3/42* (2006.01)
  *H04M 3/46* (2006.01)
  *H04M 7/12* (2006.01)
  *H04L 29/06* (2006.01)

(52) U.S. Cl.
  CPC ....... *H04L 65/1036* (2013.01); *H04L 65/1073* (2013.01); *H04L 65/1076* (2013.01); *H04M 3/42102* (2013.01); *H04M 3/46* (2013.01); *H04M 7/125* (2013.01)

(56) References Cited

U.S. PATENT DOCUMENTS

| | | | |
|---|---|---|---|
| 8,279,855 B2 * | 10/2012 | Hwang et al. | 370/352 |
| 2003/0096581 A1 * | 5/2003 | Takamine | 455/84 |
| 2006/0135137 A1 | 6/2006 | Chung | |
| 2008/0130554 A1 * | 6/2008 | Gisby et al. | 370/328 |
| 2008/0317236 A1 * | 12/2008 | Forte | 379/211.02 |
| 2009/0052650 A1 * | 2/2009 | Abramson et al. | 379/211.02 |
| 2009/0279683 A1 * | 11/2009 | Gisby et al. | 379/201.02 |
| 2010/0104033 A1 * | 4/2010 | Gorokhov | 375/260 |

FOREIGN PATENT DOCUMENTS

| | | |
|---|---|---|
| CN | 101841492 | 9/2010 |
| JP | 8-98240 | 4/1996 |
| WO | 2009/046169 A1 | 4/2009 |

OTHER PUBLICATIONS

Written Opinion of the International Searching Authority, dated Sep. 8, 2011, in corresponding International Application No. PCT/CN2011/074705 (7 pp.).

International Search Report, mailed Sep. 8, 2011, in corresponding International Application No. PCT/CN2011/074705 (6 pp.).

Extended European Search Report mailed May 6, 2013 for corresponding European Application No. 11786093.2.

* cited by examiner

METHOD, DEVICE AND SYSTEM FOR UNIFORM NUMBER COMMUNICATION ON A HOME GATEWAY

CROSS-REFERENCE TO RELATED APPLICATION

This application is a continuation of International Application No. PCT/CN2011/074705, filed on May 26, 2011, which claims priority to Chinese Patent Application No. 201010183342.3 filed on May 26, 2010, titled "METHOD, DEVICE AND SYSTEM FOR UNIFORM NUMBER COMMUNICATION ON A HOME GATEWAY", both of which are hereby incorporated by reference in their entireties.

FIELD OF THE INVENTION

The present invention relates to the field of communication technologies, and in particular, to a method, a device and a system for uniform number communication on a home gateway.

BACKGROUND OF THE INVENTION

Figure 1:
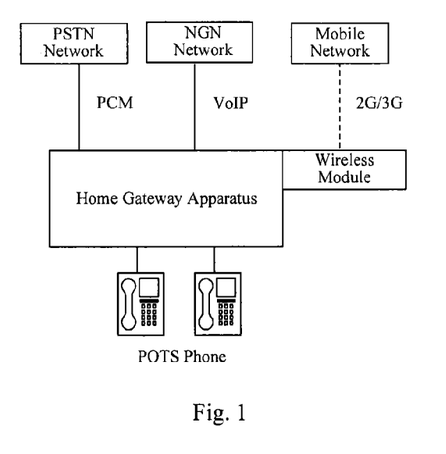
FIG. 1 is a structural schematic diagram of the connection between a home gateway and a terminal in uniform number communication of the prior art.

As shown in FIG. 1, a traditional home gateway apparatus may support a dual-upstream of Voice Over IP (VoIP) and Public Switched Telephone Network (PSTN), and thus a voice upstream in a CS (radio circuit bearer) domain in external data card mode or built-in wireless module mode may be provided.

On a home gateway apparatus, the above three kinds of voice paths may exist simultaneously. Because these three kinds of voices belong to three kinds of different networks, all the three numbers can be called on one user phone.

In the field of telephone communications, various information is communicated via a uniform number in a uniform number mode, and it is not necessary to remember each terminal number. The communication function of the uniform number lies in that, when the uniform number is called, the system may sequentially connect a mobile phone, a fixed line telephone or other specified telephone, and when the call cannot be connected, it may be automatically transferred to a voice mailbox or a secretary.

When implementing the above solution, the inventors find that the technical solution of the prior art at least has the following problems: if there are multiple phones existing under one home gateway and a certain phone thereof occupies an upstream path (for example, VoIP) for conversation, at this point, when this VoIP number is called again, a busy tone may be presented, and no connection can be established. Under the application scene of a home gateway, a wireless module is of plug-and-play, that is, the wireless number may vary. When the numbers under a home gateway are integrated by a user in the uniform number mode, the variation of wireless numbers may cause a confusion of numbers under the home gateway.

SUMMARY OF THE INVENTION

The technical problem to be solved by the present invention is to provide a method, a device and a system for uniform number communication on a home gateway, wherein the application of a uniform number service on the home gateway can be optimized by binding, on the home gateway, the terminal numbers of terminals connected to an interface of the home gateway and automatically configuring a uniform number and the incoming call priority of the bound terminal numbers, and thus user experience is improved and simultaneously the maintenance workload is reduced.

To solve the above technical problem, the following technical solutions are employed in the method, the device and the system for uniform number communication on a home gateway according to the invention:

A method for uniform number communication on a home gateway, including:

binding terminal numbers of terminals connected to an interface of the home gateway to a uniform number, and configuring a binding relation for the bound terminal numbers, wherein the binding relation includes the bound terminal numbers and an incoming call priority of the bound terminal numbers; and sending a uniform number binding message carrying the uniform number and the binding relation.

A home gateway, including:

a binding unit, adapted to bind terminal numbers of terminals connected to an interface of the home gateway to a uniform number and configure a binding relation for the bound terminal numbers, wherein the binding relation includes the bound terminal numbers and an incoming call priority of the bound terminal numbers; and a sending unit, adapted to send a uniform number binding message carrying the uniform number and the binding relation.

A method for uniform number communication on a home gateway, including:

receiving a uniform number binding message that carries a uniform number and a binding relation, wherein the binding relation includes bound terminal numbers and an incoming call priority of the bound terminal numbers; and parsing the uniform number binding message and obtaining the binding relation.

A network apparatus, including:

a receiving unit, adapted to receive a uniform number binding message that carries a uniform number and a binding relation, wherein the binding relation includes bound terminal numbers and an incoming call priority of the bound terminal numbers;

a parsing unit, adapted to parse the uniform number binding message and obtain the binding relation.

A system for uniform number communication on a home gateway, including a home gateway and a network apparatus, wherein:

the home gateway is adapted to bind terminal numbers of terminals connected to an interface of the home gateway to a uniform number and configure a binding relation for the bound terminal numbers, and send a uniform number binding message carrying the uniform number and the binding relation to the network apparatus, wherein the binding relation includes bound terminal numbers and an incoming call priority of the bound terminal numbers; and the network apparatus is adapted to receive the uniform number binding message carrying the uniform number and the binding relation that is sent by the home gateway, and parse the uniform number binding message and obtain the binding relation.

In the technical solutions according to the embodiments of the invention, under the application scene of the uniform number service, by utilizing the prior art of uniform number communications, a home gateway automatically binds multiple terminal numbers connected to an interface of the home gateway according to a binding strategy preconfigured on the home gateway and reports a uniform number binding message carrying a binding relation to a network apparatus. The network apparatus receives the uniform number binding message and obtains the binding relation, and determines the incoming call priority of the terminal numbers bound to the uniform number according to the binding relation, so that when a terminal under the uniform number is busy, connections to the bound terminal numbers may be established in turn according to the priority, thereby a user can configure a connection sequence of the bound terminal numbers by himself/herself. In such solutions, the user does not need to manually treat the binding relation of terminal numbers, thus the application of a uniform number service on the home gateway may be optimized, user experience may be improved, and maintenance workload may be alleviated.

BRIEF DESCRIPTION OF THE DRAWINGS

In order to more clearly illustrate the technical solutions of the embodiments of the invention or of the prior art, the drawings needed in the description of the embodiments will be briefly introduced below. Apparently, the drawings in the description below are only some embodiments of the invention, and other drawings may also be obtained by one of ordinary skills in the art according to these drawings without creative work.

DETAILED DESCRIPTION OF THE EMBODIMENTS

The technical solutions in the embodiments of the invention will be described clearly and fully below in conjunction with the drawings in the embodiments of the invention. Apparently, the embodiments described are only a part of the embodiments of the invention, rather than being the whole embodiments. All the other embodiments obtained by one of ordinary skills in the art based on the embodiments of the invention without creative work pertain to the protection scope of the invention.

The embodiments of the invention provide a method, a device and a system for uniform number communication on a home gateway. The application of a uniform number service on a home gateway can be optimized by automatically configuring a uniform number and the incoming call priority of the bound numbers on the home gateway, and thus user experience is improved and simultaneously the maintenance workload is reduced.

Method Embodiment 1

Figure 2:
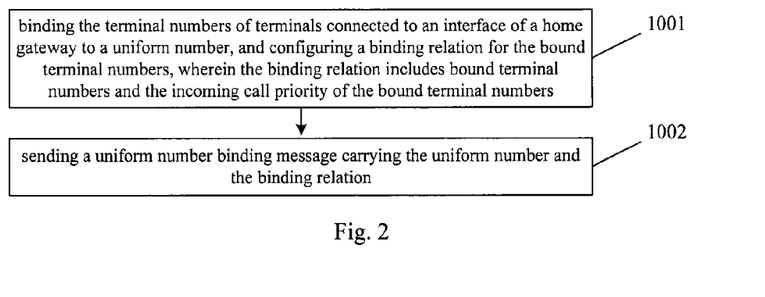
FIG. 2 is a first flowchart of the method for uniform number communication on a home gateway according to Method Embodiment 1 of the invention.

An embodiment of the invention provides a method for uniform number communication on a home gateway, as shown in FIG. 2, which includes:

Step 1001: binding terminal numbers of terminals connected to an interface of a home gateway to a uniform number, and configuring a binding relation for the bound terminal numbers, wherein the binding relation includes the bound terminal numbers and the incoming call priority of the bound terminal numbers.

Wherein, the terminal number may include: PSTN number, VoIP number and wireless module number.

Specifically, the home gateway can record the binding relation, including: PSTN number, VoIP number and wireless module number, as well as the incoming call priority of the bound PSTN number, VoIP number and wireless module number.

The home gateway binds the PSTN number, VoIP number and wireless module number connected to an interface of the home gateway to a uniform number according to a preset binding strategy, and a user may configure the incoming call priority of the PSTN number, VoIP number and wireless module number on the home gateway.

Step 1002: sending a uniform number binding message carrying the uniform number and the binding relation.

The home gateway sends, regularly or by triggering, a uniform number binding message to a network apparatus, so that the network apparatus may determine the incoming call priority of the terminal numbers bound to the uniform number according to the binding relation, and schedule to connect the bound terminal numbers in turn according to the priority.

Figure 3:
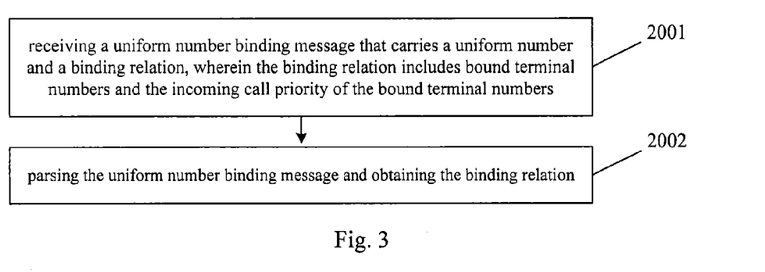
FIG. 3 is a second flowchart of the method for uniform number communication on a home gateway according to Method Embodiment 1 of the invention.

An embodiment of the invention further provides a method for uniform number communication on a home gateway, as shown in FIG. 3, which includes:

Step 2001: receiving a uniform number binding message that carries a uniform number and a binding relation, wherein the binding relation includes bound terminal numbers and the incoming call priority of the bound terminal numbers.

A network apparatus receives a binding strategy preset by the home gateway and binds terminal numbers connected to the network apparatus to a uniform number, wherein the terminal number may include one or several of PSTN number, VoIP number and wireless module number, and a user may configure the incoming call priority of the PSTN number, VoIP number and wireless module number on the home gateway.

Step 2002: parsing the uniform number binding message and obtaining the binding relation.

The network apparatus parses the uniform number binding message received from the home gateway and obtains the binding relation of the uniform number, and determines the incoming call priority of the terminal numbers bound to the uniform number according to the binding relation, and schedules to connect the bound terminal numbers in turn according to the incoming call priority.

In the technical solution according to the embodiments of the invention, under the application scene of a uniform number service, by utilizing the prior art of uniform number communications, the home gateway automatically binds multiple terminal numbers according to a binding strategy preconfigured on the home gateway, and reports a uniform number binding message carrying a binding relation to a network apparatus; the network apparatus receives the uniform number binding message and obtains the binding relation, and determines the incoming call priority of the terminal numbers bound to the uniform number according to the binding relation, so that when a terminal under the uniform number is busy, connections to the bound terminal numbers may be established in turn according to the incoming call priority, thereby a user can configure a connection sequence of the bound terminal numbers by himself/herself. In such solutions, the user does not need to manually treat the binding relation of terminal numbers, thus the application of the uniform number service on the home gateway may be optimized, user experience may be improved, and maintenance workload may be alleviated.

Method Embodiment 2

Figure 4:
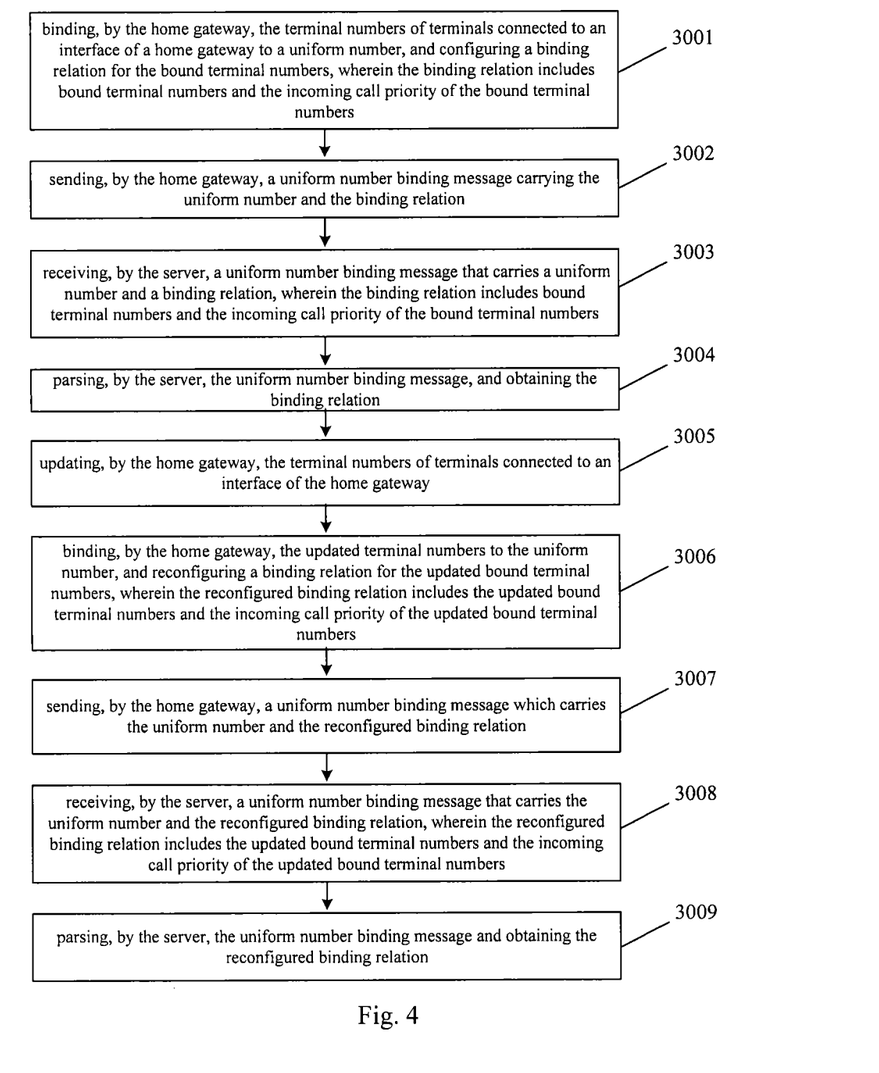
FIG. 4 is a flowchart of the method for uniform number communication on a home gateway according to Method Embodiment 2 of the invention.

An embodiment of the invention provides a method for uniform number communication on a home gateway. In this embodiment, illustration will be given by an example in which a server of an Operation Support System (OSS) is taken as the network apparatus. As shown in FIG. 4, the method includes:

Step 3001: binding, by a home gateway, terminal numbers of terminals connected to an interface of a home gateway to a uniform number, and configuring a binding relation for the bound terminal numbers, wherein the binding relation includes bound terminal numbers and the incoming call priority of the bound terminal numbers.

Wherein, the above terminal number may include: PSTN number, VoIP number and wireless module number.

Specifically, the home gateway can record the binding relation, including: PSTN number, VoIP number and wireless module number, as well as the incoming call priority of the bound PSTN number, VoIP number and wireless module number.

The home gateway binds the PSTN number, VoIP number and wireless module number connected thereto to a uniform number according to a preset binding strategy, and the user may configure the incoming call priority of the PSTN number, VoIP number and wireless module number on the home gateway.

Step 3002: sending, by the home gateway, a uniform number binding message carrying the uniform number and the binding relation.

The home gateway sends, regularly or by triggering, a uniform number binding message to a specified OSS-side server, wherein the message may be sent via an IP network or a 3G network.

The uniform number binding message should at least include: the uniform number and the binding relation, wherein the binding relation includes the bound terminal numbers and the incoming call priority of the bound terminal numbers.

In the present embodiment, the uniform number binding message is sent by employing the User Datagram Protocol (UDP, for short).

The structure of the message UDP data segment of the uniform number binding message is defined as follows:

```
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|        personal uniform number         | number of bound numbers|
+-+-+-+-+-+-+-+-+-+-+-+-+-+-+-+-+-+-+-+-+-+-+-+-+-+-+-+-+-+-+-+-+
|           first bound number           |     priority          |
+-+-+-+-+-+-+-+-+-+-+-+-+-+-+-+-+-+-+-+-+-+-+-+-+-+-+-+-+-+-+-+-+
|          second bound number           |     priority          |
+-+-+-+-+-+-+-+-+-+-+-+-+-+-+-+-+-+-+-+-+-+-+-+-+-+-+-+-+-+-+-+-+
|                 ...                    |                       |
+-+-+-+-+-+-+-+-+-+-+-+-+-+-+-+-+-+-+-+-+-+-+-+-+-+-+-+-+-+-+-+-+
|            $n^{th}$ bound number       |     priority          |
+-+-+-+-+-+-+-+-+-+-+-+-+-+-+-+-+-+-+-+-+-+-+-+-+-+-+-+-+-+-+-+-+
```

For example, for the above structure of the message UDP data segment, there are 4 bound numbers, including: 075534895421, 075565478389, 075588854321 and wireless module number 1376543211, then the structure of the message UDP data segment of the uniform number binding message that is sent is defined as:

```
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|12345678                                |4                      |
+-+-+-+-+-+-+-+-+-+-+-+-+-+-+-+-+-+-+-+-+-+-+-+-+-+-+-+-+-+-+-+-+
|075534895421                            |1                      |
+-+-+-+-+-+-+-+-+-+-+-+-+-+-+-+-+-+-+-+-+-+-+-+-+-+-+-+-+-+-+-+-+
|075565478389                            |2                      |
+-+-+-+-+-+-+-+-+-+-+-+-+-+-+-+-+-+-+-+-+-+-+-+-+-+-+-+-+-+-+-+-+
|075588854321                            |3                      |
+-+-+-+-+-+-+-+-+-+-+-+-+-+-+-+-+-+-+-+-+-+-+-+-+-+-+-+-+-+-+-+-+
|1376543211                              |4                      |
+-+-+-+-+-+-+-+-+-+-+-+-+-+-+-+-+-+-+-+-+-+-+-+-+-+-+-+-+-+-+-+-+
```

Step 3003: receiving, by the server, the uniform number binding message that carries the uniform number and the binding relation, wherein the binding relation includes the bound terminal numbers and the incoming call priority of the bound terminal numbers.

The server of the OSS receives the uniform number binding message sent by the home gateway, from the sever-side port: 23023.

Step 3004: parsing, by the server, the uniform number binding message, and obtaining the binding relation.

After the server receives the uniform number binding message, the server parses the data and obtains the binding relation, and determines the incoming call priority of the terminal numbers bound to the uniform number according to the binding relation, so as to connect the bound terminal numbers in turn according to the priority.

Step 3005: updating, by the home gateway, the terminal number of the terminal connected to an interface of the home gateway, when the terminal connected to the interface of the home gateway is changed.

In this step, the terminals connected to the interface of the home gateway at least includes: PSTN terminal, VoIP terminal and wireless module, wherein the change of terminals connected to an interface of the home gateway means that any one or more of the above terminals change the connection state with the interface of the home gateway.

For example, for the plugging in and pulling out of a wireless module, when a wireless module is plugged in or pulled out, first of all, the home gateway obtains the wireless module number of the wireless module connected to the interface of the current home gateway; specifically, when a user plugs in or pulls out a wireless module, the home gateway automatically detects the wireless module number (that is, mobile phone number).

The home gateway supports to query the wireless module number via an AT (Attention) instruction. For example, the home gateway supports to query the wireless module number via Unstructured Supplementary Service Data (USSD, for short), for example, with a query code of 99:

```
AT+CUSD=1, "3939", 15
OK
```

The network side will reply, supposing that the number is "86139037601":

+CUSD=0, "313339303337363031", 1

Furthermore, the home gateway updates the terminal numbers of terminals connected to the interface of the home gateway according to the obtained wireless module number of the wireless module connected to the interface of the current home gateway.

Step 3006: binding, by the home gateway, the updated terminal numbers to the uniform number, and reconfiguring a binding relation for the updated bound terminal numbers, wherein the reconfigured binding relation includes the updated bound terminal numbers and the incoming call priority of the updated bound terminal numbers.

Wherein, the above terminal number includes: PSTN number, VoIP number and the updated wireless module number.

The reconfiguring of the binding relation also includes reconfiguring the incoming call priority for the above terminal numbers.

Step 3007: sending, by the home gateway, a uniform number binding message which carries the uniform number and the reconfigured binding relation.

The home gateway sends, regularly or by triggering, a uniform number binding message to a specified OSS-side server, wherein the message may be sent via an IP network or a 3G network.

If in Step 3006, it is detected that the wireless module is pulled out, then there are 3 bound numbers, including: 075534895421, 075565478389 and 075588854321, then the structure of the message UDP data segment of the uniform number binding message that is sent is defined as:

```
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+
|12345678                           |3         |
+-+-+-+-+-+-+-+-+-+-+-+-+-+-+-+-+-+-+-+-+-+-+-+-+
|075534895421                       |1         |
+-+-+-+-+-+-+-+-+-+-+-+-+-+-+-+-+-+-+-+-+-+-+-+-+
|075565478389                       |2         |
+-+-+-+-+-+-+-+-+-+-+-+-+-+-+-+-+-+-+-+-+-+-+-+-+
|075588854321                       |3         |
+-+-+-+-+-+-+-+-+-+-+-+-+-+-+-+-+-+-+-+-+-+-+-+-+
```

If in Step 3006, it is detected that a new wireless module is plugged in after a wireless module is pulled out, then there are 4 bound numbers, including: 075534895421, 075565478389, 075588854321 and wireless module number 1581012345, then the structure of the message UDP data segment of the uniform number binding message that is sent is defined as:

```
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+
|12345678                           |4         |
+-+-+-+-+-+-+-+-+-+-+-+-+-+-+-+-+-+-+-+-+-+-+-+-+
|075534895421                       |1         |
+-+-+-+-+-+-+-+-+-+-+-+-+-+-+-+-+-+-+-+-+-+-+-+-+
|075565478389                       |2         |
+-+-+-+-+-+-+-+-+-+-+-+-+-+-+-+-+-+-+-+-+-+-+-+-+
|075588854321                       |3         |
+-+-+-+-+-+-+-+-+-+-+-+-+-+-+-+-+-+-+-+-+-+-+-+-+
|1581012345                         |4         |
+-+-+-+-+-+-+-+-+-+-+-+-+-+-+-+-+-+-+-+-+-+-+-+-+
```

Step 3008: receiving, by the server, a uniform number binding message that carries the uniform number and the reconfigured binding relation, wherein the reconfigured binding relation includes the updated bound terminal numbers and the incoming call priority of the updated bound terminal numbers.

The server of the OSS receives the uniform number binding message sent by the home gateway, from the sever-side port: 23023.

Step 3009: parsing, by the server, the uniform number binding message and obtaining the reconfigured binding relation.

When the server receives the uniform number binding message, the server parses the data and obtains the reconfigured binding relation, and updates the terminal numbers bound to the uniform number and the incoming call priority of the bound terminal numbers according to the reconfigured binding relation, so as to connect the bound terminal numbers in turn according to the incoming call priority.

In the technical solution according to the embodiment of the invention, under the application scene of the uniform number service, by utilizing the prior art of uniform number communications, the home gateway automatically binds multiple terminal numbers according to a binding strategy preconfigured on the home gateway and reports a uniform number binding message carrying a binding relation to an office-side OSS. The server of the OSS receives the uniform number binding message and obtains the binding relation, and determines the incoming call priority of the terminal numbers bound to the uniform number according to the binding relation, so that when a terminal under the uniform number is busy, connections to the bound terminal numbers may be established in turn according to the priority, thereby a user can configure a connection sequence of the bound terminal numbers by himself/herself. Moreover, when a wireless module is plugged in or pulled out, the home gateway automatically detects the state of the wireless module and obtains the wireless module number, reconfigures a binding relation with the uniform number for the updated wireless module number and other terminal numbers, and sends the reconfigured binding relation to the network-side server via a uniform number binding message. The network-side server parses the uniform number binding message received, obtains the reconfigured binding relation, and refreshes the binding relation under the original uniform number. In the solution according to the embodiment of the invention, a user does not need to manually treat the binding relation of terminal numbers, thus the application of the uniform number service on the home gateway may be optimized, user experience may be improved, and maintenance workload may be alleviated.

Device Embodiment

Figure 5:
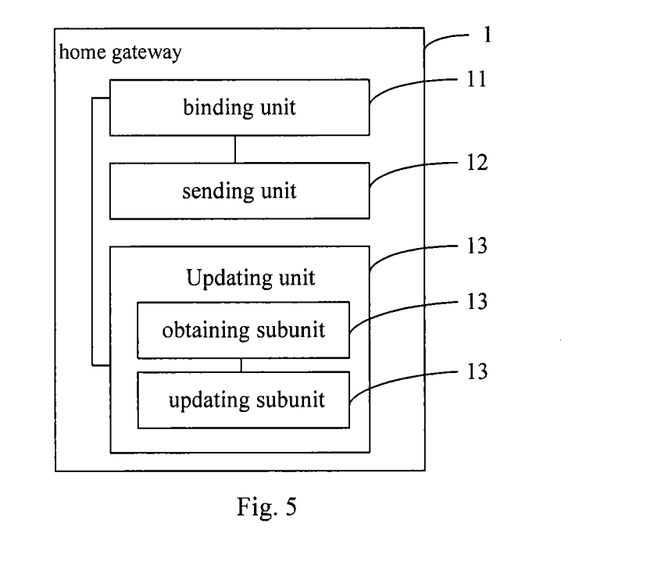
FIG. 5 is a structural schematic diagram of a home gateway according to a device embodiment of the invention.

An embodiment of the invention provides a home gateway. As shown in FIG. 5, the home gateway 1 includes: a binding unit 11 and a sending unit 12.

The binding unit 11 is adapted to bind terminal numbers of terminals connected to an interface of a home gateway to a uniform number, and configure a binding relation for the bound terminal numbers, wherein the binding relation includes bound terminal numbers and the incoming call priority of the bound terminal numbers. The sending unit 12 is adapted to send a uniform number binding message carrying the uniform number and the binding relation.

Furthermore, the home gateway 1 further includes: an updating unit 13.

The updating unit 13 is adapted to update the terminal numbers of terminals connected to the interface of the home gateway 1 when the terminals connected to the interface of the home gateway 1 are changed.

Then, the binding unit 11 is further adapted to bind the updated terminal numbers to the uniform number and reconfigure a binding relation for the updated bound terminal numbers, wherein the reconfigured binding relation includes the updated bound terminal numbers and the incoming call priority of the updated bound terminal numbers. Then, the sending unit 12 is further adapted to send a uniform number binding message which carries the uniform number and the reconfigured binding relation.

Moreover, the updating unit 13 includes: an obtaining subunit 131 and an updating subunit 132.

The obtaining subunit 131 is adapted to obtain the wireless module number of the current connected wireless module when a wireless module is plugged in or pulled out. The updating subunit 132 is adapted to update the terminal numbers of terminals connected to the interface of the home gateway 1 according to the wireless module number of the current connected wireless module that is obtained.

Figure 6:
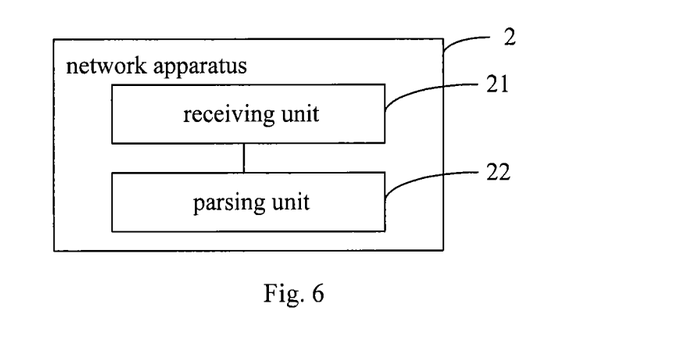
FIG. 6 is a structural schematic diagram of a network apparatus according to a device embodiment of the invention.

An embodiment of the invention further provides a network apparatus. As shown in FIG. 6, the network apparatus 2 includes: a receiving unit 21 and a parsing unit 22.

The receiving unit 21 is adapted to receive a uniform number binding message that carries a uniform number and a binding relation, wherein the binding relation includes bound terminal numbers and the incoming call priority of the bound terminal numbers. The parsing unit 22 is adapted to parse the uniform number binding message and obtain the binding relation.

Furthermore, the receiving unit 21 is further adapted to receive a uniform number binding message that carries the uniform number and the reconfigured binding relation, wherein the reconfigured binding relation includes the updated bound terminal numbers and the incoming call priority of the updated bound terminal numbers.

Moreover, the parsing unit 22 is further adapted to parse the uniform number binding message and obtain the reconfigured binding relation.

In the technical solution according to the embodiment of the invention, under the application scene of the uniform number service, by utilizing the prior art of uniform number communications, the home gateway automatically binds multiple terminal numbers according to a binding strategy preconfigured on the home gateway, and reports a uniform number binding message carrying a binding relation to a network apparatus. The network apparatus receives the uniform number binding message and obtains the binding relation, and determines the incoming call priority of the terminal numbers bound to the uniform number according to the binding relation, so that when a terminal under the uniform number is busy, connections to the bound terminal numbers may be established in turn according to the priority, thereby a user can configure a connection sequence of the bound terminal numbers by himself/herself. Moreover, when a wireless module is plugged in or pulled out, the home gateway automatically detects the state of the wireless module and obtains the wireless module number, reconfigures a binding relation with the uniform number for the updated wireless module number and other terminal numbers, and sends the reconfigured binding relation to the network apparatus via a uniform number binding message. The network apparatus parses the uniform number binding message received, obtains the reconfigured binding relation, and refreshes the binding relation under the original uniform number. In the solution according to the embodiment of the invention, a user does not need to manually treat the binding relation of terminal numbers, thus the application of the uniform number service on the home gateway may be optimized, user experience may be improved, and maintenance workload may be alleviated.

System Embodiment

Figure 7:
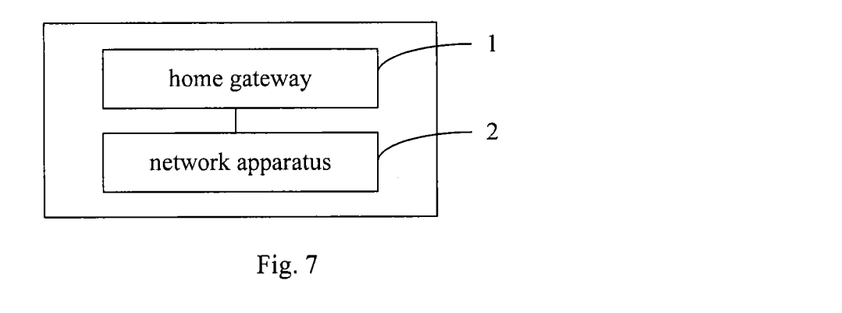
FIG. 7 is a structural schematic diagram of a system for uniform number communication on a home gateway according to a system embodiment of the invention.

An embodiment of the invention provides a system for uniform number communication on a home gateway. As shown in FIG. 7, the system includes: a home gateway 1 and a network apparatus 2, wherein:

The home gateway 1 is adapted to bind the terminal numbers of terminals connected to an interface of the home gateway 1 to a uniform number, configure a binding relation for the bound terminal numbers, and send a uniform number binding message carrying the uniform number and the binding relation to the network apparatus 2, wherein the binding relation includes bound terminal numbers and the incoming call priority of the bound terminal numbers.

The network apparatus 2 is adapted to receive the uniform number binding message carrying the uniform number and the binding relation that is sent by the home gateway 1, and parse the uniform number binding message and obtain the binding relation.

In the technical solution according to the embodiments of the invention, under the application scene of the uniform number service, by utilizing the prior art of uniform number communications, the home gateway automatically binds multiple terminal numbers according to a binding strategy preconfigured on the home gateway, and reports a uniform number binding message carrying a binding relation to a network apparatus. The network apparatus receives the uniform number binding message and obtains the binding relation, and determines the incoming call priority of the terminal numbers bound to the uniform number according to the binding relation, so that when a terminal under the uniform number is busy, connections to the bound terminal numbers may be established in turn according to the priority, thereby a user can configure a connection sequence of the bound terminal numbers by himself/herself. In such solutions, a user does not need to manually treat the binding relation of terminal numbers, thus the application of the uniform number service on the home gateway may be optimized, user experience may be improved, and maintenance workload may be alleviated.

With the description of the above embodiments, one skilled in the art may clearly understand that the invention may be implemented by the aid of software plus necessary universal hardware. Certainly, the invention may be implemented by hardware. However, in many cases, the former is preferred. Based on such understanding, the essential part of the invention, or in other words, the part that contributes to the prior art, may be embodied in the form of a software product that is stored in a readable storage medium, such as floppy disk, hard disk or compact disc, etc., of a computer and includes several instructions that can make a computer apparatus (which may be a personal computer, a server or a network apparatus, etc.) implement the methods according to various embodiments of the invention.

The above are only specific embodiments of the invention. However, the scope of protection of the present invention is not limited thereto. Variations and modifications will readily occur to those skilled in the art in the technical scope disclosed by the present invention without departing from the spirit or scope of the invention. Thus, the scope of protection of the present invention is defined by the scope of protection of the appended claims.

What is claimed is:

1. A method comprising:
  binding, on a home gateway implemented by computer hardware, terminal numbers of terminals connected to an interface of the home gateway to a uniform number, the terminals connected to the interface of the home gateway including a first wireless module implemented by computer hardware;
  configuring, on the home gateway, a binding relation for the bound terminal numbers, wherein the binding relation includes the bound terminal numbers and an incoming call priority of the bound terminal numbers;
  sending, by the home gateway to a network apparatus implemented by computer hardware, a uniform number binding message carrying the uniform number and the binding relation; and
  when, after the uniform number binding message is sent by said sending, the first wireless module is pulled out and is thereby no longer connected to the interface of the home gateway, and a second wireless module implemented by computer hardware is plugged in and is thereby connected to the interface of the home gateway,
    obtaining, by the home gateway, a wireless module number of the second wireless module,
    updating, by the home gateway, the terminal numbers of the terminals connected to the interface of the home gateway to include the obtained wireless module number of the second wireless module and to indicate that the first wireless module is no longer connected to the interface of the home gateway,
  binding, by the home gateway, the updated terminal numbers to the uniform number, and reconfiguring a binding relation for the bound updated terminal numbers, wherein the reconfigured binding relation includes the bound updated terminal numbers and an incoming call priority of the bound updated terminal numbers, and
  sending, by the home gateway to the network apparatus, a uniform number binding message which carries the uniform number and the reconfigured binding relation.

2. A method according to claim 1, further comprising:
  determining, by the network apparatus, the incoming call priority according to the binding relation in the uniform number binding message sent to the network apparatus; and
  scheduling, by the network apparatus, to connect the bound terminal numbers according to the determined incoming call priority.

3. A home gateway comprising:
  computer hardware that provides:
    a binding unit, configured to bind terminal numbers of terminals connected to an interface of the home gateway to a uniform number and configure a binding relation for the bound terminal numbers, wherein the binding relation includes the bound terminal numbers and an incoming call priority of the bound terminal numbers, and the terminals connected to the interface of the home gateway include a first wireless module implemented by computer hardware;
    a sending unit, configured to send a uniform number binding message carrying the uniform number and the binding relation to a network apparatus implemented by computer hardware; and
    an updating unit, configured to, when, after the uniform number binding message is sent by the sending unit, the first wireless module is pulled out and is thereby no longer connected to the interface of the home gateway, and a second wireless module implemented by computer hardware is plugged in and is thereby connected to the interface of the home gateway,
      obtain a wireless module number of the second wireless module, and
      update the terminal numbers of the terminals connected to the interface of the home gateway to include the obtained wireless module number of the second wireless module and to indicate that the first wireless module is no longer connected to the interface of the home gateway,
  wherein the binding unit is further configured to bind the updated terminal numbers to the uniform number, and reconfigure a binding relation for the bound updated terminal numbers, wherein the reconfigured binding relation includes the bound updated terminal numbers and an incoming call priority of the bound updated terminal numbers, and
  wherein the sending unit is further configured to send, to the network apparatus, a uniform number binding message which carries the uniform number and the reconfigured binding relation.

4. A method comprising:
  receiving, from a home gateway implemented by computer hardware by a network apparatus implemented by computer hardware, a first uniform number binding message that carries a uniform number and a binding relation, wherein the binding relation includes bound terminal numbers of terminals connected to an interface of the home gateway and an incoming call priority of the bound terminal numbers, and the terminals connected to the interface of the home gateway include a first wireless module implemented by computer hardware;

parsing, by the network apparatus, the first uniform number binding message and obtaining the binding relation; and when, after the first uniform number binding message is received by the network apparatus, the first wireless module is pulled out and is thereby no longer connected to the interface of the home gateway, and a second wireless module implemented by computer hardware is plugged in and is thereby connected to the interface of the home gateway, receiving, by the network apparatus, a second uniform number binding message which carries the uniform number and a reconfigured binding relation that includes bound updated terminal numbers and an incoming call priority of the bound updated terminal numbers, the bound updated terminal numbers indicating updated terminal numbers of the terminals connected to the interface of the home gateway and thereby including a wireless module number of the second wireless module and indicating that the first wireless module is no longer connected to the interface of the home gateway, and parsing, by the network apparatus, the second uniform number binding message and obtaining the reconfigured binding relation.

5. A network apparatus comprising:

computer hardware that provides:

a receiving unit, configured to receive, from a home gateway implemented by computer hardware, a first uniform number binding message that carries a uniform number and a binding relation, wherein the binding relation includes bound terminal numbers of terminals connected to an interface of the home gateway and an incoming call priority of the bound terminal numbers, and the terminals connected to the interface of the home gateway include a first wireless module implemented by computer hardware;

a parsing unit, configured to parse the uniform number binding message and obtain the binding relation, wherein the receiving unit is further configured to, when, after the first uniform number binding message is received by the receiving unit, the first wireless module is pulled out and is thereby no longer connected to the interface of the home gateway, and a second wireless module implemented by computer hardware is plugged in and is thereby connected to the interface of the home gateway, receive, from the home gateway, a second uniform number binding message which carries the uniform number and a reconfigured binding relation that includes bound updated terminal numbers and an incoming call priority of the bound updated terminal numbers, the bound updated terminal numbers indicating updated terminal numbers of the terminals connected to the interface of the home gateway and thereby including a wireless module number of the second wireless module and indicating that the first wireless module is no longer connected to the interface of the home gateway, and wherein the parsing unit is further configured to parse the second uniform number binding message and obtaining the reconfigured binding relation.

6. A system comprising:

a home gateway implemented by computer hardware; and a network apparatus implemented by computer hardware, wherein:

the home gateway is configured to bind terminal numbers of terminals connected to an interface of the home gateway to a uniform number and configure a binding relation for the bound terminal numbers, the terminals connected to the interface of the home gateway including a first wireless module implemented by computer hardware, and to send a first uniform number binding message carrying the uniform number and the binding relation to the network apparatus, wherein the binding relation includes bound terminal numbers and an incoming call priority of the bound terminal numbers; and the network apparatus is configured to receive the first uniform number binding message carrying the uniform number and the binding relation that is sent by the home gateway, and parse the uniform number binding message and obtain the binding relation, wherein the home gateway is further configured to, when, after the first uniform number binding message is sent by the home gateway, the first wireless module is pulled out and is thereby no longer connected to the interface of the home gateway, and a second wireless module implemented by computer hardware is plugged in and is thereby connected to the interface of the home gateway, obtain a wireless module number of the second wireless module, update the terminal numbers of the terminals connected to the interface of the home gateway to include the obtained wireless module number of the second wireless module and to indicate that the first wireless module is no longer connected to the interface of the home gateway, bind the updated terminal numbers to the uniform number, and reconfigure a binding relation for the bound updated terminal numbers, wherein the reconfigured binding relation includes the bound updated terminal numbers and an incoming call priority of the bound updated terminal numbers, and send a second uniform number binding message which carries the uniform number and the reconfigured binding relation, and the network apparatus is further configured to receive the second uniform number binding message, and parse the second uniform number binding message to obtain the reconfigured binding relation.

7. A system according to claim 6, wherein the network apparatus is configured to:

determine the incoming call priority according to the binding relation in the first uniform number binding message received by the network apparatus, and schedule to connect the bound terminal numbers according to the determined incoming call priority.

* * * * *

UNITED STATES PATENT AND TRADEMARK OFFICE
CERTIFICATE OF CORRECTION

PATENT NO.         : 9,137,731 B2
APPLICATION NO.    : 13/684909
DATED              : September 15, 2015
INVENTOR(S)        : Ke Zhang et al.

It is certified that error appears in the above-identified patent and that said Letters Patent is hereby corrected as shown below:

Title Page, First Column, (30) Foreign Application Priority Data

Delete        "May 26, 2010   (CN) ....................... 2010 1 0183342"

and insert    --May 26, 2010   (CN) ....................... 2010 1 0183342.3--, therefor.

Signed and Sealed this
First Day of December, 2015

Michelle K. Lee
*Director of the United States Patent and Trademark Office*